UNITED STATES PATENT OFFICE 2,378,769

EYE-PROTECTING GLASSES

Harrison P. Hood, Corning, N. Y., assignor to Corning Glass Works, Corning, N. Y., a corporation of New York No Drawing. Application December 28, 1942, Serial No. 470,403

3 Claims. (Cl. 106—54)

This invention relates to eye-protecting glasses, and particularly to those known as welders' glasses which are used for goggles and eye shields employed in welding. The absorption characteristics of prior welders' glasses are substantially uniform throughout the visible spectrum and such glasses have been satisfactory for use where the glare to be absorbed is due primarily to the incandescence of the metal or metals being welded. In the welding of aluminum there is substantially no incandescent glare because aluminum melts at a relatively low temperature and does not become highly incandescent during welding. However, in the welding of aluminum a large amount of flux is ordinarily employed and the action of the welding frame on the flux creates a glare which the prior glasses are unable entirely to absorb even though the density of the coloration of the glass or its thickness were increased to the point of seriously diminishing the visible luminosity. As a result, the welding of aluminum was a difficult process on account of inability to see the work distinctly during welding.

An object of this invention is to counteract and circumvent the glare which is caused by the use of excessive amounts of flux in welding.

Another object is to counteract the glare which is caused by the use of flux and at the same time to neutralize and absorb excessive radiations in the red and infra-red and in the ultra-violet.

Another object is to provide an eye protecting glass which will absorb glare and specific radiations.

Another object is to provide an eye-protecting glass which is particularly suitable for use in welding aluminum.

I have found that the above and other objects may be attained by means of a glass which contains about 5% to 20% of $Nd_2O_3$ together with about .02% to 5% of the oxides of chromium and copper. As examples of glasses which are suitable for my purpose, the following composition in calculated weight percentages is given:

| | |
|---|---:|
| $SiO_2$ | 60 |
| $Na_2O$ | 17 |
| $B_2O_3$ | 2 |
| $La_2O_3$ | 10 |
| $Nd_2O_3$ | 10 |
| CuO | .8 |
| $Cr_2O_3$ | .4 |

As a source of neodymium I have used a product known commercially as "rare earth hydrates" comprising chiefly a mixture of the hydroxides of lanthanum and neodymium in approximately equal proportions. The equivalent content of neodymium oxide in this material is about 30%–35% $Nd_2O_3$. Other neodymium containing materials may also be used.

The above composition has a bright green color and in 3 mm. thickness is an excellent eye protecting glass particularly suitable for use in the welding of aluminum, the green color being substantially absorptive to heat rays and long wave radiations. It is to be understood that the color saturation or density and the hue of my new glass may be varied by altering the proportions of the coloring oxides. Moreover if desired, other combinations of the recited coloring oxides may be employed, in each instance neodymium oxide being present for the purpose of neutralizing or absorbing the glare due to heat-decomposed flux material.

I claim:

1. A colored eye-protecting silicate glass the coloring constituents of which consist of 5% to 20% $Nd_2O_3$, .5% to 1.5% CuO and .3% to .7% $Cr_2O_3$.

2. A colored eye-protecting silicate glass the coloring constituents of which consist of about 10% $Nd_2O_3$, .8% CuO and .4% $Cr_2O_3$.

3. An eye-protecting glass which consists approximately of 60% $SiO_2$, 17% $R_2O$, 2% $B_2O_3$, 10% $La_2O_3$, 10% $Nd_2O_3$, .8% CuO and .4% $Cr_2O_3$.

HARRISON P. HOOD.